US008623959B2

(12) United States Patent
Fuqua et al.

(10) Patent No.: US 8,623,959 B2
(45) Date of Patent: *Jan. 7, 2014

(54) NON-VEINING URETHANE RESINS FOR FOUNDRY SAND CASTING

(76) Inventors: Joseph M. Fuqua, Fond du Lac, WI (US); Jianbo Di, Palatine, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/113,664

(22) Filed: May 23, 2011

(65) Prior Publication Data

US 2011/0220316 A1 Sep. 15, 2011

Related U.S. Application Data

(63) Continuation-in-part of application No. 12/574,475, filed on Oct. 6, 2009, and a continuation-in-part of application No. 12/574,501, filed on Oct. 6, 2009, and a continuation-in-part of application No. 12/574,525, filed on Oct. 6, 2009.

(51) Int. Cl.
*C08G 63/48* (2006.01)

(52) U.S. Cl.
USPC .......................................... 525/54.5; 524/871

(58) Field of Classification Search
USPC ........................................ 524/871; 525/54.5
See application file for complete search history.

(56) References Cited

U.S. PATENT DOCUMENTS

| | | |
|---|---|---|
| 3,023,113 A | 2/1962 | Barlow |
| 3,083,118 A | 3/1963 | Bridgeford |
| 3,330,686 A | 7/1967 | Rose |
| 3,409,579 A | 11/1968 | Robins |
| 3,429,848 A | 2/1969 | Robins |
| 3,432,457 A | 3/1969 | Robins |
| 3,445,251 A | 5/1969 | Nevins |
| 3,535,359 A | 10/1970 | Chadwick |
| 3,676,392 A | 7/1972 | Robins |
| 3,743,621 A | 7/1973 | Molotsky |
| 3,832,191 A | 8/1974 | Bolding et al. |

(Continued)

FOREIGN PATENT DOCUMENTS

| | | |
|---|---|---|
| CA | 0 843 443 | 6/1970 |
| EP | 0 361 447 | 4/1990 |

(Continued)

OTHER PUBLICATIONS

"What's in Product Data Base" (Consumer Product Information Database), pp. 167 (2001). URL:http://whatsinproducts.com/search_database_results.php.

(Continued)

*Primary Examiner* — James J. Seidleck
*Assistant Examiner* — Peter A Salamon
(74) *Attorney, Agent, or Firm* — Marshall, Gerstein & Borun LLP

(57) ABSTRACT

Described herein a method of manufacturing a metal shape that includes contacting a liquid metal and a surface of a foundry core under conditions wherein vein defects occur, the surface of the foundry core comprising a foundry aggregate, a combustible-organic material and a polyurethane resin, and the surface of the foundry core being free of or essentially free of an anti-veining agent; cooling the liquid metal to a temperature below its melting point thereby forming a metal shape; and then removing the foundry core from the metal shape.

32 Claims, 4 Drawing Sheets
(3 of 4 Drawing Sheet(s) Filed in Color)

(56) References Cited

U.S. PATENT DOCUMENTS

| | | | |
|---|---|---|---|
| 3,862,080 A | 1/1975 | Standen et al. | |
| 3,925,296 A | 12/1975 | Stone et al. | |
| 4,311,631 A | 1/1982 | Myers et al. | |
| 4,359,339 A | 11/1982 | Van Fisk, Jr. | |
| 4,400,475 A | 8/1983 | Kennedy | |
| 4,417,998 A | 11/1983 | Kennedy | |
| 4,586,936 A | 5/1986 | Schaffer et al. | |
| 4,597,878 A | 7/1986 | House et al. | |
| 4,608,397 A | 8/1986 | Reischl | |
| 4,705,570 A | 11/1987 | Paul et al. | |
| 4,734,439 A | 3/1988 | Reischl | |
| 4,735,973 A * | 4/1988 | Brander | 523/139 |
| 4,801,621 A | 1/1989 | Reischl | |
| 4,851,457 A | 7/1989 | Kurple | |
| 4,855,052 A | 8/1989 | Reischl | |
| 5,244,473 A | 9/1993 | Sardessai et al. | |
| 5,320,157 A * | 6/1994 | Siak et al. | 164/12 |
| 5,376,696 A | 12/1994 | Dunnavant et al. | |
| 5,430,072 A | 7/1995 | Muller et al. | |
| 5,455,287 A | 10/1995 | Carpenter et al. | |
| 5,585,428 A | 12/1996 | Quinn et al. | |
| 5,611,853 A | 3/1997 | Morimoto | |
| 5,616,628 A | 4/1997 | Von Bonin et al. | |
| 5,688,313 A | 11/1997 | Landis | |
| 5,695,554 A | 12/1997 | Landis | |
| 5,769,933 A | 6/1998 | Landis | |
| 5,810,918 A | 9/1998 | Landis | |
| 5,856,375 A | 1/1999 | Chang et al. | |
| 5,911,269 A * | 6/1999 | Brander et al. | 164/523 |
| 5,916,826 A | 6/1999 | White | |
| 6,005,021 A | 12/1999 | Chen et al. | |
| 6,136,888 A | 10/2000 | Torbus et al. | |
| 6,264,775 B1 | 7/2001 | Holeschovsky et al. | |
| 6,288,139 B1 | 9/2001 | Skoglund | |
| 6,291,550 B1 | 9/2001 | Chen et al. | |
| 6,506,223 B2 | 1/2003 | White | |
| 6,509,392 B1 | 1/2003 | Jhaveri et al. | |
| 6,554,049 B2 | 4/2003 | Steele et al. | |
| 6,559,203 B2 | 5/2003 | Hutchings et al. | |
| 6,719,835 B2 * | 4/2004 | Brown | 106/38.2 |
| 6,772,820 B2 | 8/2004 | Roze et al. | |
| 6,822,042 B2 | 11/2004 | Capps | |
| 6,834,706 B2 | 12/2004 | Steele et al. | |
| 6,846,849 B2 | 1/2005 | Capps | |
| 6,972,302 B2 | 12/2005 | Baker et al. | |
| 7,871,972 B2 | 1/2011 | SenGupta | |
| 2004/0039235 A1 | 2/2004 | Bergstrom et al. | |
| 2005/0017394 A1 | 1/2005 | Hochsmann et al. | |
| 2007/0281876 A1 | 12/2007 | Garner et al. | |
| 2008/0277351 A1 | 11/2008 | Harman et al. | |
| 2009/0162408 A1 | 6/2009 | SenGupta | |
| 2009/0314461 A1 | 12/2009 | Attridge et al. | |
| 2010/0319874 A1 | 12/2010 | Thiel et al. | |
| 2011/0019044 A1 | 1/2011 | Wang et al. | |
| 2011/0079366 A1 | 4/2011 | Fuqua et al. | |
| 2011/0081270 A1 | 4/2011 | Fuqua | |
| 2011/0082233 A1 | 4/2011 | Sengupta et al. | |

FOREIGN PATENT DOCUMENTS

| | | |
|---|---|---|
| WO | WO-02/28937 | 4/2002 |
| WO | WO-2009/065015 | 5/2009 |
| WO | WO-2009/065018 A1 | 5/2009 |
| WO | WO 2009065018 A1 * | 5/2009 |
| WO | WO-2009/126960 A2 | 10/2009 |
| WO | WO-2009/155242 A1 | 12/2009 |
| WO | WO-2011/044003 A2 | 4/2011 |
| WO | WO-2011/044004 A2 | 4/2011 |
| WO | WO-2011/044005 A1 | 4/2011 |

OTHER PUBLICATIONS

Greene et al., Protective Groups in Organic Synthesis, John Wily & Sons (1999).

Jhurry et al., "Sucrose-Based Polymers: Polyurethanes with Sucrose in the Main Chain," *Eur. Polym. J.*, 33:1577-1582 (1997).

Visser et al., "Observations on the Dispersion and Aggregation of Clays by Humic Substances, I. Dispersive Effects of Humic Acids," *Geoderma*, 42(3-4):331-337 (1988). Abstract Only.

International Search Report and Written Opinion for Application No. PCT/US2010/051254, dated Feb. 16, 2011.

International Search Report and Written Opinion for Application No. PCT/US2010/051251, dated Oct. 7, 2011.

International Search Report and Written Opinion for Application No. PCT/US2010/051253, dated Oct. 7, 2011.

International Preliminary Report on Patentability for Application No. PCT/US2010/051254, dated Aug. 2, 2011.

Monroe, Use of Iron Oxide in mold and core mixes for ferrous castings, AFS Transactions, 93: 355-364 (1985).

International search report and written opinion for International Application No. PCT/US12/33861, mailing date Jul. 17, 2012.

\* cited by examiner

NON-VEINING URETHANE RESINS FOR FOUNDRY SAND CASTING

CROSS-REFERENCE TO RELATED APPLICATIONS

The benefit of priority as a Continuation-in-Part of U.S. patent application Ser. Nos. 12/574,475; 12/574,501; and 12/574,525, all filed on Oct. 6, 2009, is claimed and each priority document is incorporated herein by reference in its entirety.

TECHNICAL FIELD

This invention relates to polymerizable resin binders, particularly useful as foundry binders, processes for making foundry shapes by curing the binders in place after forming a foundry mold or core, foundry mixes and multi-part resin binder components or kits that are mixed on site to bind foundry aggregate, such as sand, in a desired shape.

BACKGROUND

Sand cores are used to form the internal cavities of a finished casting. When sand cores are placed in a mold and molten metal is introduced into the mold, a rapid thermal expansion of the sand in the sand cores takes place. As a result of the rapid thermal expansion of the sand in the sand core, the sand core cracks, and the molten metal runs into the cracks in the core, creating a fin projecting from the casting surface (in foundry terms, a "vein") as the molten metal solidifies. These veining defects, caused by uncontrolled core sand thermal expansion, are most often controlled by anti-veining or expansion control agents, which are mixed uniformly with the sand and core sand binders prior to the formation of the sand cores themselves. Anti-veining or expansion control agents change the thermal coefficient of expansion of the sand core to control its cracking and reduce or eliminate the formation of veins.

For years, iron oxides were used in foundries to improve sand cores and the qualities of castings. Iron oxides proved to be advantageous in sand cores by reducing the formation of thermal expansion defects such as veining. Iron oxides in use include red iron oxide ($Fe_2O_3$), also known as hematite, black iron oxide ($Fe_3O_4$), known as magnetite, and yellow ochre. The most common methods of employing such iron oxides are by addition of approximately 1% to 3% by weight to the core sand during mixing. The mechanism by which iron oxides improve the surface finish is not known. One theory is that the iron oxides increase the plasticity of the sand core during casting by formation of sand grain interfaces which deform, or give, without fracturing, thereby preventing cracks in the core which can form veins in the casting.

U.S. Pat. No. 4,735,973 discloses an additive for the foundry sands used to produce cores and molds which improves the quality of the castings by reducing thermal expansion and gas defects, thereby reducing the veins formed in a casting. The disclosed additive comprises a composition containing from about 15% to about 95% titanium dioxide ($TiO_2$), including a preferable additive comprising about 2% to about 38% silicon dioxide ($SiO_2$), about 5% to about 40% ferric oxide ($Fe_2O_3$), about 15% to about 95% titanium dioxide ($TiO_2$), and about 2% to about 45% aluminum oxide ($Al_2O_3$). The resulting sand cores are described as comprising about 80% to about 98% of core sand aggregates selected from a group consisting of silica sand, zircon sand, olivine sand, chromite sand, lake sand, bank sand, fused silica, and mixtures thereof, about 0.5% to about 10% of a core sand binder, and about 0.5% to about 5% of an additive composition containing from about 15% to about 95% titanium dioxide ($TiO_2$). The use of such additives in sand cores is described as reducing the casting defects associated with the use of plastic bonded and other core binder systems, increasing the strength of the resulting bonded core sand, and allowing a reduction in the amount of plastic binder required.

U.S. Pat. No. 5,911,269 discloses a method of making silica sand cores utilizing lithium-containing materials that provide a source of lithium oxide ($Li_2O$) to improve the quality of castings by reducing sand core thermal expansion and the veins resulting therefrom in metal castings. The disclosed method of making sand cores comprises the steps of preparing an aggregate of sand core and a resin binder, and mixing into the aggregate a lithium-containing additive selected from a group consisting of .α.-spodumene, amblygonite, montebrasite, petalite, lepidolite, zinnwaldite, eucryptite and lithium carbonate, in the amount to provide from about 0.001% to about 2% of lithium oxide. The use of such a method and lithium oxide-containing additives is described as reducing the casting defects associated with thermal expansion of silica, including the formation of veins in the cavity and improving the surface finish of the castings.

Examples of commercially available anti-veining additives include VEINSEAL 14000 (IGC Technologies Inc., Milwaukee, Wis.). VEINSEAL 14000 comprises 60-70 wt. % $SiO_2$, 10-20 wt. % $Fe_3O_4$, 15-25 wt. % $Al_2O_3$, 10-25 wt. % $TiO_2$ and 2-5 wt. % $Li_2O$. Typical loadings of VEINSEAL in a foundry mold is about 1-5 wt. % on the total weight of the foundry aggregate. Unfortunately, the costs, even at this low dosage are relatively high. Other commercially available anti-veining agents include VEINSEAL 15000 from IGC Technologies, and VEINO Ashland Inc.

SUMMARY

Described herein, in the preferred embodiment, is a casting method that yields vein-free products, the method includes a mold or a core that is essentially free of anti-veining agents.

One embodiment includes manufacturing a metal shape by contacting a liquid metal and a surface of a foundry core under conditions wherein vein defects occur, the surface of the foundry core carried by a foundry core layer that comprises a foundry aggregate, a combustible-organic material and a polyurethane resin, and the foundry core layer being essentially free of an anti-veining agent; cooling the liquid metal to a temperature below its melting point thereby forming a metal shape; and then removing the foundry core from the metal shape.

Another embodiment includes casting vein-free metal shapes by determining conditions wherein vein defects occur; forming a foundry core that comprises a foundry aggregate, a combustible-organic material, a polyurethane resin, and that is essentially free of anti-veining agents; contacting a liquid metal with the foundry core under the conditions wherein vein defects occur; and then removing a cooled metal shape from the foundry core; wherein the metal shape is free of or substantially free of vein defects.

Still another embodiment includes manufacturing a metal shape by contacting a liquid metal with a foundry core and a foundry mold, that individually comprise a foundry aggregate, a combustible-organic material and a polyurethane resin, and are essentially free of an anti-veining agent; and then separating the metal shape from the foundry core and foundry mold.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee. For a more complete understanding of the disclosure, reference should be made to the following detailed description and accompanying drawing figures wherein.

DETAILED DESCRIPTION

Figure 1:
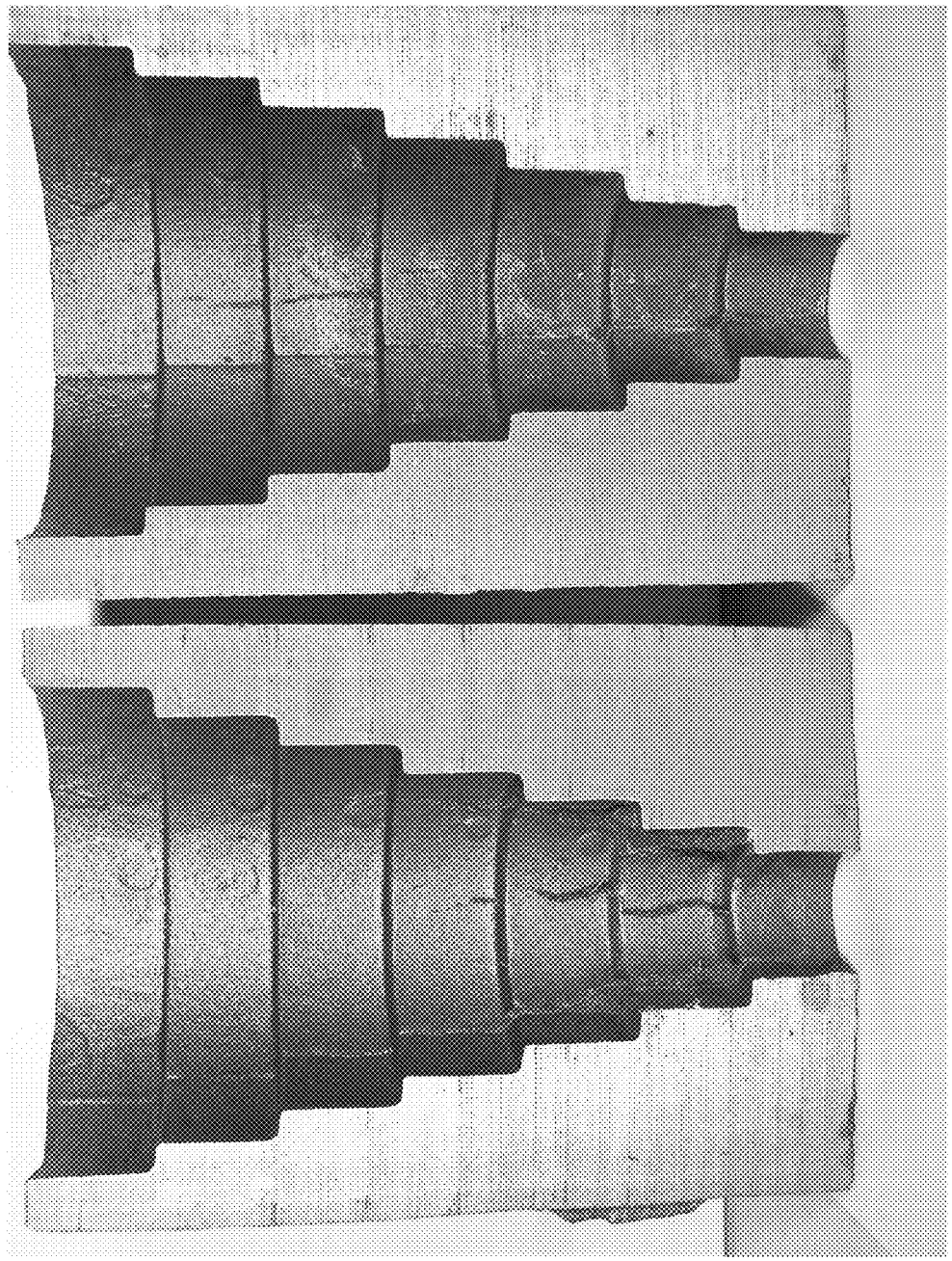
FIG. 1 is a color photograph of step core castings, the left casting having heavy vein defects, the right casting having little to no vein defects.

Foundry shapes can be formed from a foundry mix, e.g., by the in situ polymerization of a polyol with an isocyanate, as an admixture with a foundry aggregate. In a preferred embodiment, the admixture of the polyol, isocyanate, and foundry aggregate further includes a polyurethane polymerization catalyst and a combustible-organic solid. The formation of the foundry mix typically involves the stepwise addition of the components to the foundry aggregate, e.g. sand, with mixing, to form a foundry mix that sets or cures to form a structurally sound shape over the course of a predetermined time, typically minutes. The admixing of the components can be either stepwise in the foundry aggregate or some of the components, e.g., the polyol component and/or the catalyst component, can be admixed prior to admixing with the foundry aggregate. The polyol-isocyanate components form a polyurethane resin that binds the foundry aggregate and permits the formation of a foundry shape useful in metal casting.

The foundry shape carries a foundry-shape surface on a foundry-shape layer. On pouring of a liquid metal into a foundry shape, the foundry-shape surface contacts the liquid metal and can provide a structural relief (shape) upon which the liquid metal solidifies. The foundry-shape layer that carries the foundry-shape surface can extend into the foundry shape up to 1 cm or about 1 cm. The foundry-shape layer is preferably free of or essentially free of anti-veining agents, and furthermore has preferably the same composition as the foundry shape. In some circumstances, the foundry-shape surface can be coated with a coating or wash that can be advantageous to the quality of the final cast metal product. For example, a core wash can be applied to the foundry shape (typically the foundry core) as a liquid suspension of a refractory material; the refractory material, for example, can be graphite, coke, mica, silica, aluminum oxide, magnesium oxide, talc, zircon flour and mixtures of these materials.

The articles, compositions, foundry mixes and methods described herein may be understood more readily by reference to the following detailed description and the examples provided. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

As used herein, the phrase "conditions wherein vein defects occur" means those conditions in casting a liquid metal upon a resin-bound, sand-based foundry shape, that is free of or essentially free of anti-veining agents, that yield a metal shape having vein defects. The casting "conditions wherein vein defects occur" can include those conditions where an anti-veining agent is typically added to the resin-bound, sand-based foundry shape to prevent or reduce the veining defects. Preferably, the "conditions wherein vein defects occur" are those where the foundry shape consists essentially of a foundry aggregate (e.g., silica sand) and an effective amount of a binder (e.g., a polyurethane resin). More preferably, the "conditions wherein vein defects occur" are those where the foundry shape consists of the foundry aggregate and an effective amount of the binder. Even more preferably, the "conditions wherein vein defects occur" include a foundry-shape layer and a foundry-shape surface that contacts molten metal which consists essentially of the foundry aggregate and the binder. Conditions where casting a liquid metal upon a resin-bound, sand-based foundry shape that consists essentially of the foundry aggregate and an effective amount of binder yields a metal shape free of or essentially free of veining defects are excluded from the definition of "conditions wherein vein defects occur." Furthermore and as used herein, "vein defects" means those veining defects recognized by one of ordinary skill in the art of metal casting, and preferably recognized as reducible or preventable by the addition of an anti-veining agent to the foundry shape.

Herein, the foundry mix and the foundry shape can include a resin (e.g., the polymerized product of a polyol and an isocyanate) and a foundry aggregate, but excludes an added anti-veining agent. This means, the foundry mix and foundry shape, the manufacture of which is described herein, are free of or essentially free of the anti-veining agent. Herein, a foundry shape that is "essentially free of" an anti-veining agent excludes added anti-veining agent(s) but may include unavoidable impurities in starting materials and essential ingredients. The unavoidable impurities might include not more than 0.5 wt. %, preferably not more than 0.1 wt %, more preferably not more than 0.05 wt % of an anti-veining agent or combined anti-veining agents in the foundry shape. The source and quality of the foundry aggregate may have some effect on the amount of unavoidable impurities in the foundry shape, as would be understood by one of ordinary skill. Notably, one of ordinary skill can draw a line between unavoidable impurities and added anti-veining agents. Herein, anti-veining agents include, for example, iron oxides (e.g., $Fe_2O_3$ and $Fe_3O_4$), titanium dioxide, lithium oxide, sodium bicarbonate (NORACEL W 100), sodium carbonate, shale (e.g., U.S. Pat. No. 6,719,835), fine ground glass particles, red talc and wood flour (i.e. particles of wood pre-coated with a resin), granular slag, pulverized sea-coal, alkaline earth or alkaline metal fluoride, lithia-containing materials, and any other compound, composition, or mixture thereof incorporated in cores or molds, known to reduce or eliminate veining defects in cast metal parts in a foundry operation.

In an alternative embodiment and despite the observation that anti-veining agents are not necessary, the addition of anti-veining agents to the herein disclosed foundry mix or foundry shape is contemplated. This addition of materials that are known anti-veining agents does not provide a positive or a negative (excluding economic) affect on the anti-veining performance of the foundry shape. As such, these agents are considered non-performance additives.

The polyol component can be small molecule polyols, polymeric polyols, or a blend or a plurality of polyols. Herein, the polyol(s) can include, but is not limited to, glycols and glycerols. Glycols include those linear glycols that have a molecular formula of HO—$(CH_2CH_2O)_x$—H, where x is a value between 1 and about 25; and the branched polyols that have a molecular formula of HO—$(CH_2CH_2(R)O)_x$—H, where x is a value between 1 and about 25, and R is a linear, branched, cyclic, alkyl, and/or aromatic group that optionally includes one or more pnictide, chacogenide, and/or halide-containing functionalities. Glycerols are a preferred class of polyols, wherein R contains an alcohol functionality. Polyols can additionally include mixed glycols and mixed glycerols. An illustrative example of a mixed glycol is a hydroxy-ethyleneglycol-p-xylene (HOCH$_2$C$_6$H$_4$CH$_2$OCH$_2$CH$_2$OH). In one embodiment, the polyol can includes or can consist essentially of a linear glycol having a molecular formula HO—$(CH_2CH_2(R)O)_x$—H wherein x is a value between 1 and about 10, more preferably wherein x is between 1 and about 5, and even more preferably 3 (e.g., wherein the glycol is triethylene glycol ("TEG")).

Furthermore, the polyol can include at least one polyether polyol. Polyether polyols are produced by polymerizing one or more alkylene oxides (such as ethylene oxide and/or propylene oxide) with suitable initiators including but not limited to ethylene glycol, diethylene glycol, triethylen glycol, propylene glycol, dipropylene glycol, glycerine, aliphatic amine, aromatic amine, phenol, sorbitol, sucrose or a combination of the above. The moles of alkylene oxide polymerized per mole of initiator can be anywhere from about 0.1 to about 200. The polyols should have at least two hydroxyl group functionality per molecule. Each hydroxyl group can be a primary or a secondary hydroxyl group.

Examples of suitable polyols include ethylene glycol, diethylene glycol, triethylene glycol, dipropylene glycol, 2-methyl-1,3-propanediol, JEFFOL G30-650, JEFFOL SG-360, JEFFOL SG-522 and other JEFFOL polyols available from HUNTSMAN CORP., Auburn Hills, Mich. Preferably, suitable polyols have a hydroxyl functionality in a range of 2 to 5 (moles OH/moles polyol); a molecular weight in a range of 50 g/mol to 6,000 g/mol; a hydroxyl number in a range of 100 to 800; an equivalency weight in a range of 50 g/mol to 300 g/mol; and/or a viscosity at 25° C. in a range of 50 cps to 20,000 cps.

In one embodiment, a mixture of two or more polyols can be used. In another embodiment, the polyol component can include one or more organic solvents admixed with the polyol. Preferably, the viscosity of the polyol component is in a range of about 0.1 cps to about 3000 cps, about 0.1 cps to about 1500 cps, about 0.1 cps to about 1000 cps, or about 0.1 cps to about 500 cps.

Isocyanates are preferably (poly-iso)cyanates, for example a diisocyanate, a triisocyanate, and so on. This isocyanate component can be a small molecule isocyanate, a polymeric isocyanate, or a blend of a plurality of isocyanates. Suitable isocyanates include p-phenylene diisocyanate (CAS No. 104-49-4), toluene diisocyanate (CAS No. 1321-38-6), 4,4'-methylenebis(phenylisocyanate) (CAS No. 101-68-8), polymethylene polyphenyl isocyanate (CAS No. 9016-87-9), 1,5-naphthalene diisocyanate (CAS No. 3173-72-6), bitolylene diisocyanate (CAS No. 91-97-4), m-xylene diisocyanate (CAS No. 3634-83-1), m-tetramethylxylene diisocyanate (CAS No. 58067-42-8), hexamethylene diisocyanate, (CAS No. 4098-71-9), 1,6-diisocyanato-2,2,4,4-tetramethylhexane (CAS No. 83748-30-5), 1,6-diisocyanato-2,4,4-trimethylhexane (CAS No. 15646-96-5), trans-cyclohexane-1,4-diisocyanate (CAS No. 2556-36-7), 1,3-bis(isocyanatomethyl)cyclohexane (CAS No. 38661-72-2), 3-isocyanato-methyl-3,5,5-trimethylcyclohexyl isocyanate (CAS No. 4098-71-9), dicyclohexylmethane diisocyanate (CAS No. 5124-30-1) and the polymeric 4,4'-methylene bis(phenylisocyanates) available under the MONDUR product line from BAYER MATERIALSCIENCE. Preferably, the isocyanate component is the "Mondur MR" product available from BAYER MATERIALSCIENCE.

Herein, the polyol and isocyanate components are polymerized to form a polyurethane resin. The polymerization is preferably conducted by a catalyst; the catalyst can include tin and tertiary amine catalysts. Preferably, the catalyst favors the gelation reaction (urethane formation) over the blowing reaction (urea formation), as understood in the art. A non-limiting list of applicable catalysts include 1,4-diazabicyclo[2.2.2]octane (DABCO), 1,5-diazabicyclo[4.3.0]non-5-ene (DBN), 1,8-diazabicyclo[5.4.0]undec-7-ene (DBU), pentamethyldipropylenetriamine, bis(dimethylamino ethyl)ether, pentamethyldiethylenetriamine, dimethylcyclohexylamine, tris(3-dimethylamino) propylamine, 1-methylimidzole, 1-vinylimidazole, 4-phenol propyl pyridine, and other liquidus or gaseous tertiary amines. Preferably, the catalyst component is tris(3-dimethylamino) propylamine and/or 4-phenol propyl pyridine.

The type of aggregate and amount of binder (e.g., the polyurethane resin) used to prepare foundry mixes can vary widely and is known to those skilled in the art. In one preferred embodiment, the aggregate is silica sand. In other embodiments, the aggregate can be olivine, zircon, chromite, carbon, fluid coke, related materials, mixtures thereof, and mixtures thereof with silica sand. Preferably, a majority of the foundry mix (and thereby the foundry shape) is the aggregate. More preferably, the foundry mix includes about 90 wt. % to about 99.9 wt. %, about 95 wt. % to about 99.5 wt. %, or about 97.5 wt. % to about 99 wt. % aggregate. The amount of binder can be in the range of about 0.1 wt. % to about 10 wt %, about 0.5 wt. % to about 5 wt. %, or about 1 wt. % to about 2.5 wt. %.

The foundry shapes described herein further include a combustible-organic material. In this instance, the combustible-organic material is preferably completely combustible, where completely-combustible means that the pyrolysis of the organic material at the temperature of the molten metal leaves little, e.g., less than 15, 10, or 5 wt % based on the dry weight of the organic material, to no inorganic or organic residue. Preferably, the combustible-organic material does not react with any isocyanate functionality of the isocyanate component. Examples of combustible-organic materials may include asphalt; bark; bitumen; powdered carbon; charcoal; bituminous coal; coke; flaked graphite; lignite; malt; crushed synthetic resin; pine resin; sawdust; powdered starch; glucose syrup, powdered sugar; tar; turpentine; walnut shell; wood chips and sawdust; and mixtures thereof. Preferably, the combustible-organic material has a moisture content of less than about 25 wt. % dry basis, more preferably less than about 15 wt. %, even more preferably less than about 10 wt. %, and still more preferably less than about 5 wt. %.

In one embodiment, combustible-organic materials are those that are essentially free of polymerizable hydroxyl-containing components (e.g., 0 wt. % to about 2 wt. %) and are completely combustible at molten metal temperatures, e.g. above the 1000° F. (above about 540° C.). Examples of preferable combustible organic compounds include those having a density of less than about 1200 kg/m³, more preferably less than about 1000 kg/m³, still more preferably less than about 800 kg/m³. Additionally, the preferable combustible organic compound has a moisture content of less than about 25 wt. %, more preferably less than about 20 wt. %, even more preferably less than about 15 wt. %, still more preferable less than about 10 wt. %, and even still more preferably less than about 5 wt. %. Moreover, the preferable combustible organic compound has a heat of combustion of greater than about 10 kJ/g, more preferably greater than about 15 kJ/g, even more preferably greater than about 20 kJ/g. Still further the preferable combustible organic compound has a heat capacity of less than about 2 J/g·K, more preferably less than about 1.75 J/g·K, even more preferably less than about 1.5 J/g·K, still more preferably less than about 1.25 J/g·K, and even still more preferably less than about 1 J/g·K.

Combustible-organic materials that are substantially free of reactive surface oxygen (of which polymerizable hydroxyl-containing materials is a subset) can be manufactured by the reaction of a precursor organic material with an oxygen protecting group. The specific oxygen protecting group is dependent on the chemical nature of the reactive surface oxygen, for example a hydroxyl functionality requires a different oxygen protecting group than does a carboxylate. General methods for protecting oxygen functionalities can be found in Green et al., *Protective Groups in Organic Synthesis*, (1999) John Wiley & Sons, NY, incorporated herein by reference. Specific examples include the reaction of reactive surface hydroxyls with carboxylates and/or carboxylic anhydrides. Preferably, the oxygen protecting group aids in the dispersion of the combustible-organic material in the foundry mix. In another embodiment, a combustible-organic material containing reactive surface oxygen can be encapsulated within a dispersant agent thereby making the resultant encapsulated combustible-organic material substantially free of reactive surface oxygen. For examples of applicable encapsulating technologies see Assignee's U.S. Pat. No. 7,871,972; U.S. Pat. Pub. No. 2009/0162408; and Intl Pat. Pub. No. WO2009/126960, each herein incorporated by reference.

In another embodiment, the combustible-organic material is humic organic matter, wherein humic organic matter is a catchall term for biopolymers occurring in soil, sediment, and water. Typically, the humic organic matter is a humic substance, e.g. a humic acid-containing or humic acid salt-containing ore. Preferably, the humic organic matter is a lignite, even more preferably leonardite, previously described in this Assignee's U.S. Pat. Nos. 5,695,554 and 5,688,313, and hereby incorporated by reference. More preferably, the humic substance is a solid lignite component, that contains no more than about 35 wt. % water, more preferably about 0 wt. % to about 20 wt. % water, even more preferably about 0 wt. % to about 10 wt. %, based on the dry weight of the lignite. Even more preferably, the lignite component is leonardite and incorporated into the foundry mix at a concentration from about 1 wt. % to about 70 wt. % of the resin in the final foundry mix, more preferably from about 5 wt. % to about 50 wt. %, and even more preferably from about 10 wt. % to about 30 wt. %. The concentrations are based on the total dry weight of lignite and the total weight of added active polymerizable polyol and isocyanate. With binder concentrations in the range of about 0.5 wt. % to about 3 wt. %, the concentration of lignite in the foundry mix can be in the range of about 0.005 wt. % to about 2.2 wt. %, preferably about 0.05 wt. % to about 0.75 wt. % (based on the total weight of the aggregate). The mean particle size of the leonardite can be from about 50 nm to about 500 µm, from about 500 nm to about 400 µm, from about 500 nm to about 100 µm, or from about 500 nm to about 15 µm.

In another embodiment, the combustible-organic material is a polysaccharide. Herein, polysaccharide incorporates the mono and di-saccharides as well as the polymeric carbohydrate structures formed of the mono- and di-saccharides. In one aspect of this embodiment, the combustible-organic material is a starch or glycogen. The starch can be the starch sugars (e.g., maltodestrin, glucose syrup, corn syrup, dextrose, high fructose corn syrup) or starch sugar alcohols (e.g., maltitol, erythritol, sorbitol, mannitol, and hydrogenated starch hydrolysate). In still another embodiment, the combustible-organic material can be a combination of the humic material and the polysaccharide.

In a further embodiment, the foundry mix can further include a dispersing agent, a thickening agent, or a mixture thereof. Dispersing agents include homopolymers and copolymers selected from the group consisting of polyethylene glycol/poly(oxyethylene) (PEG), polypropylene glycol, poly(acrylic acid) (PAA), poly(methacrylic acid) (PMA), poly(vinyl alcohol) (PVA), poly(acrylamide), poly(ethylene imine), poly(diallyldimethyl ammonium halide), and poly (vinyl methyl ether). Preferably, the dispersing agent is a linear polymer that has hydrophilic and a hydrophobic terminal groups, more preferably hydroxyl and alkyl terminal groups. Even more preferably, the dispersing agent is a monoesterified, homo- or co-polymer of polyethylene glycol (PEG). The weight average molecular weight of the PEG-based dispersing agent is in the range of about 1,000 to about 60,000 Dalton, more preferably about 2,000 to about 30,000 Dalton, and most preferably about 4,000 to about 10,000 Dalton.

Commercial PEG polymers are generally labeled as either PEG-n or PEG M, where (n) refers to the average number of ether oxygen groups or the ethylene oxide (EO) repeat units, and the letter (M) refers to an average molecular weight of the polymer. For example, a PEG with n=150 would have an average molecular weight of about 6,000 Dalton and would be labeled as either PEG-150 or PEG 6000. For consistency herein, the PEG polymers are referred to by the average number of EO repeat units per polymer chain and one of ordinary skill in the art can convert one denotation to another.

The preferred PEGs are those PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. These are, preferably, monoesterified PEGs where the ester functionality has a linear, branched, cyclic and/or aromatic group. Preferably, the ester functionality is a linear or branched alkyl group with an alkyl chain length equal to or greater than about 8 ($C_8$). More preferably the alkyl chain length is about $C_8$-$C_{18}$, still more preferably the alkyl chain is stearate. Three non-limiting examples of dispersing agents that correspond to the above recited preferences are PEG-100 monostearate, PEG-125 monostrearate, and PEG-150 monostrearate.

Copolymer dispersing agents include those polymers made from two or more different monomers. The preferable monomers include propylene oxide, vinyl acetate, vinyl amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, and methacrylic acid. Preferably, one of the monomers is ethylene oxide. More preferably, the mole-fraction of the comonomer to ethylene oxide in the dispersing agent is preferably ≤0.4, more preferably ≤0.3, and even more preferably ≤0.2.

Dispersing agents additionally include polyvinylpyrrolidone (PVP) polymers and copolymers. Notably, PVP dispersing agents have, preferably, a higher weight average molecular weight than the PEG dispersing agents. Preferably, the weight average molecular weight of the PVP dispersing agent is in the range of about 1,000 to about 1,000,000 Dalton, more preferably about 4,000 to about 500,000 Dalton, and most preferably about 10,000 to about 100,000 Dalton. For example, one preferred PVP homopolymer dispersing agent has a weight average molecular weight of 60,000 Dalton, e.g., (PVP K-30; CAS No. 9003-39-8). Similar to the above disclosed PEG dispersing agents, PVP dispersing agents can be copolymers, including block and graft copolymers, of pyrrolidone and vinyl acetate, vinyl amine, lauryl methacrylate, methyl methacrylate, acrylic acid, methacrylic acid, hydroxystearate, dimethylsiloxane, diallyldimethyl ammonium halide, and/or ethylenimine. Dispersants can also include polyetheramines such as JEFFAMINE D series, ED series and FL-1000 (available from HUNTSMAN CORP.).

The dispersing agent can be incorporated into foundry mix as a mixture polyol and combustible-organic material. Preferably, the mixture includes about 0.1 to about 30 wt. %, more preferably about 0.25 to about 20 wt. %, even more preferably about 0.5 to about 15 wt. % of the dispersing agent, based on the weight of the combustible-organic material in the mixture.

Thickening agents include homopolymers and copolymers selected from the group consisting of polyethylene glycol/poly(oxyethylene) (PEG), poly(acrylic acid) (PAA), poly(methacrylic acid) (PMA), poly(vinyl alcohol) (PVA), poly(acrylamide), poly(ethylene imine), poly(diallyldimethyl ammonium hal), and poly(vinyl methyl ether), gelatins, and polysaccharides. Preferably, the weight average molecular weight of a PEG-based thickening agent is in the range of about 1,000 to about 60,000 Dalton, more preferably about 2,000 to about 30,000 Dalton, and most preferably about 4,000 to about 10,000 Dalton. The weight average molecular weight of non-PEG-based thickening agents can be up to about 5,000,000 Dalton. Preferably, the thickening agent is a non-esterified or a diesterified, homo- or co-polymer of polyethylene glycol (PEG). The preferable PEGs are those non-esterified or diesterified PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. The diesterified PEGs include an ester functionality that has a linear, branched, cyclic and/or aromatic group. Preferably, the ester functionality is a linear or branched alkyl group with a alkyl chain length equal to or greater than about 8 ($C_8$). More preferably the alkyl chain length is about $C_8$-$C_{18}$, still more preferably the alkyl chain is stearate. Six non-limiting examples of thickening agents that correspond to the above recited preferences are PEG-100, PEG-125, PEG-150, PEG-100 distrearate, PEG-125 distrearate, and PEG-150 distrearate. Other preferably thickening-agents include glyceryl esters, having a weight average molecular weight in the range of about 1,000 to about 15,000 Dalton, more preferably about 2,000 to about 10,000 Dalton, and most preferably about 4,000 to about 7,000 Dalton.

The thickening agent can be incorporated into foundry mix as a mixture polyol and combustible-organic material. Preferably, the mixture includes about 0.05 to about 10 wt. %, more preferably about 0.1 to about 7.5 wt. %, even more preferably about 0.2 to about 5 wt. % of the thickening agent, based on the weight of the combustible-organic material in the mixture.

In one example, the combustible-organic material and the polyol are provided as a lignite-polyol suspension. A process for preparing a lignite-polyol suspension can include: 1) mixing polyol(s), solvent(s), and dispersant to form a polyol solution; 2) admixing the polyol solution and lignite; and 3) circulating the polyol lignite mixture through an in-line high shear mixer. The process can include circulating the mixture through the mixer for a predetermined time and/or until a predetermined viscosity of suspension stability is achieved. Examples of a predetermined time can include 1 hour, 2 hours, 3 hours, and 4 hours. Examples of a predetermined viscosity can include 200 cPs, 400 cPs, and 600 cPs. Another example of a process for preparing a lignite-polyol suspension can include: 1) heating a mixture of a polyol and a dispersing agent to 70° C. in a suitable vessel; 2) mixing the polyol with lignite in a high-shear mixer at 70° C.; 3) adding a molten thickening agent; and 4) cooling the batch under agitation to ambient temperature. In one embodiment, the lignite-polyol suspension components can be included in the following weight percents to the total weight of the suspension: (A) about 0.1 to about 85 wt. % lignite, about 1 to about 70 wt. %, about 5 to about 55 wt. %, or about 10 to about 40 wt. %; (B) about 15 to about 90 wt. % polyol, about 20 to about 80 wt. % polyol, about 25 to about 70 wt. % polyol, or about 30 to about 60 wt. % polyol; (C) about 0 to about 30 wt. % dispersing agent, about 0.5 to about 25 wt. %, about 1 to about 20 wt. %, or about 1 to about 15 wt. %; and (D) about 0 to about 15 wt. % thickening agent, about 0.1 to about 12 wt. %, about 0.5 to about 10 wt. %, or about 1 to about 7 wt. %. Alternatively and when the stabilization agent is only a thickening agent, the thickening agent is included in about 0.1 to about 35 wt. %, about 1 to about 30 wt. %, or about 2 to about 25 wt. %. Specific examples of lignite-polyol suspensions include, but are not limited to, (1) an admixture of about 15 wt. % lignite; about 72 wt. % triethylene glycol; about 8 wt. % propylene carbonate ("PC"); and about 4 wt. % polyvinylpyrrolidone; (2) an admixture of about 22 wt. % lignite; about 64 wt. % triethylene glycol; about 7 wt. % propylene carbonate ("PC"); and about 6 wt. % polyvinylpyrrolidone; (3) an admixture of about 15 wt. % lignite; about 72 wt. % dipropylene glycol; about 8 wt. % propylene carbonate ("PC"); and about 4 wt. % polyvinylpyrrolidone; and (4) an admixture of about 10 wt. % lignite; about 77 wt. % JEFFOL G30-650; about 9 wt. % propylene carbonate ("PC"); and about 4 wt. % polyvinylpyrrolidone.

In one embodiment, the dispersing agent is PEG-100 stearate at a concentration of about 0.1 to 25 wt. % based on the total weight of the lignite, dry basis, preferably about 0.5 to about 5 wt. %. The polyol, preferably triethylene glycol, is incorporated at a concentration of about 15 to about 90 wt. %, based on the total final weight of the lignite-polyol suspension, preferably of about 40 to about 70 wt. %. The thickening agent is preferably a waxy compound, e.g. PEG-150 distearate or PEG-150, at a concentration of about 1 to about 10 wt. %, or about 2 to about 10 wt. %, based on the total weight of the polyol, preferably the weight percent of the thickening agent is greater than about 3 wt. %, greater than about 3.75 wt. %, or greater than about 4.25 wt. %. In another preferred embodiment, the lignite-polyol suspension further comprises an alkali, which, theoretically, may increase the solubility of the humic acid in the polyol. Sodium hydroxide or a comparable alkaline solution is added to the dispersion medium (lignite carrier) at a concentration of active base from about 0.5 to 30 wt. %, or about 5 to about 15 wt. %, of the lignite. In yet another embodiment, the polyol is admixed with a polar organic solvent prior to heating and mixing with the dispersing agent. Preferably, the molar ratio of the solvent to the glycol is about 0.05 to about 9, about 0.1 to about 3, or about 0.5 to about 1.5. Preferably, the polar organic solvent does not affect the polyurethane polymerization. Examples of polar organic solvents that do not affect the polyurethane polymerization reaction are well know to those of ordinary skill in the art, some examples of polar organic solvent classes include secondary and tertiary alcohols, ketones, amides, amines, nitriles, acetates, ethers, and aldehydes. In one, non-limiting, example with triethylene glycol ("TEG"), the polar organic solvent is propylene carbonate ("PC") and the molar ratio was 1.

In one embodiment for preparing a foundry shape, the components (e.g., the combustible-organic material, the polyol, and the isocyanate) are individually admixed with the foundry aggregate. The resultant foundry mix is mixed until nearly homogeneous, and then formed into a foundry shape. In another embodiment, the lignite-polyol suspension and the isocyanate components are premixed, then admixed with the foundry aggregate. In yet another embodiment, the lignite-polyol suspension is premixed with the catalyst component, then admixed with the foundry aggregate before the isocyanate is added. In still another embodiment, the isocyanate is premixed with the catalyst component and then admixed with the foundry aggregate.

The foundry mix is then formed into a foundry shape. Generally in the art, the mold and the core are made from different foundry mixes. The mold mix commonly comprising a clay binder and the core mix commonly comprising a polymer binder. After casting, the majority of the spent foundry shape is removed from the cast shape by shake-out. During shake-out the majority of the mold breaks free from the casting and some of the core is removed. Often the core-binders are not destroyed during casting and must be physically broken from the internal areas of the core. Following the shake-out process and core-removal, the casting is cleaned, wherein residual aggregate is removed by primarily shot blasting. Here, metal flashing and aggregate is removed from the surface of the casting and metal is often adhered to the aggregate. This multi-step process for isolating a cast shape is time consuming, costly, as well as energy and material intensive. The herein described materials and methods significantly reduce the time and energy necessary for the isolation of a cast shape by improving the shake-out, the core removal process, and the number of foundry mixes necessary to make a shape. Preferably, the mold and the core are manufactured with the herein described foundry mix and after casting are cleanly broken from the cast shake during shake-out.

In a preferred embodiment, the foundry core is manufactured from the herein described foundry mix. Preferably, the binders in the core shape are destroyed by the heat of the liquid metal and following the solidification of the metal flow freely from the core area during shakeout. More preferably, about 30 to about 60% more aggregate is removed during shake-out when the herein described foundry mix is used to form the foundry shape than when the foundry shape is manufactured from an admixture consisting essentially of the foundry aggregate and a polyurethane resin. Even more preferably and possibly due to improved burn-out of the binder, the reclamation costs for the aggregate are decreased by about 20 to about 50%.

The metal casting (an article of manufacture) is preferably formed by pouring liquid metal onto the foundry shape. The processes of casting or contacting the liquid metal and the foundry shape is understood by one of ordinary skill of the art and the terms "casting", "contacting," and "pouring onto" have similar meanings. The metal making up the casting and/or the liquid can be any metal capable of being cast in an aggregate shape. Examples of metals include iron, steels, carbon steels, stainless steels, chromium steels, alloys, aluminum, titanium, zinc, copper, silver, gold, platinum, palladium, nickel, cobalt, manganese, and mixtures thereof. Preferably, the liquid metal is poured at a sufficiently high temperature to facilitate the burnout of the core resin.

In one embodiment, a metal shape can be made by contacting a liquid metal and a surface of a foundry core under conditions wherein vein defects occur. The surface of the foundry core, and/or preferably the foundry core layer, can include a foundry aggregate, a combustible-organic material and a polyurethane resin, but is essentially free of an anti-veining agent. After casting (contacting), the liquid metal is cooled to a temperature below its melting point and solidifies into a metal shape (used herein to mean the solid material). The foundry core can then be removed from the metal shape, for example by shake-out. Preferably, the entire foundry core has the same composition as the foundry core layer, and/or the surface of the foundry core, that is, the core includes the foundry aggregate, the combustible-organic solid and the polyurethane resin. Similarly, the foundry core should be essentially free of the anti-veining agent. Preferable combustible-organic materials are lignite, malt, glucose syrup, powdered sugar, and a mixture thereof; more preferably, lignite, glucose syrup, and a mixture thereof.

The foundry shape, and preferably the core, include the foundry aggregate, the combustible-organic solid, and the reaction product of a polyol, and an isocyanate. The polyol and the isocyanate can be polymerized to form a polyurethane resin. The resin, admixed with the aggregate, can then be cured to yield a solid foundry shape (e.g., a core).

In another embodiment, the process for manufacturing the metal shape can include, first, determining the conditions where vein defects occur, for example, by test casting a metal shape in/on a foundry shape that consists of the foundry aggregate and a polyurethane resin. When the cast metal shape has one or more vein defects as a result of the casting conditions and foundry shape composition, these casting conditions have been determined to be conditions where vein defects occur. Under these conditions, the liquid metal is contacted with a foundry shape that includes a foundry aggregate, a combustible-organic material, a polyurethane resin, and that is free of or essentially free of anti-veining agents. After the metal solidifies, the foundry shape is removed from the cooled metal shape, e.g., by shaking out the aggregate. This casting, of the metal on the foundry shape that includes the foundry aggregate, combustible-organic material, and polyurethane resin, and that is essentially free of anti-veining agents casting, results in a metal shape that is free of or substantially free of vein defects.

Herein, "substantially free of vein defects" means the metal shape is largely but not necessarily free of vein defects observable by one of ordinary skill in casting metal shapes. Notably, small vein defects and large vein defects are distinguishable based on the height and width of the vein defect, and the shape of the metal part. Preferably, the metal shape that is substantially free of vein defects is free of large vein defects and is substantially free of small vein defects. See FIG. 1.

In yet another embodiment, the process for manufacturing the metal shape includes limiting the mechanical distortion of the foundry core during the casting of the metal shape. The distortion of the foundry core can be limited to a negative displacement (contraction) as opposed to the common positive displacement (expansion) associated with sand cores. For example, the distortion of the foundry core can be limited to less than 0.11 mm or less than 0.10 mm based on the Thermal Distortion Test described in Example 7. Preferably, the expansion of the foundry core is less than 0.09 mm, 0.08 mm, 0.07 mm, 0.06 mm, 0.05 mm, 0.04 mm, 0.03 mm, 0.02 mm, or 0.01 mm based on the Thermal Distortion Test (i.e., a maximum average expansion based on twelve trials). More preferably, the foundry core does not expand, that is the expansion is approximately 0.00 mm based on the Thermal Distortion Test. Alternatively, the foundry core contracts based on the Thermal Distortion Test.

In still another embodiment, the metal shape can be manufactured by contacting liquid metal with a foundry core and a foundry mold, that have the same composition. For example, the core and mold are formed from a mixture of a foundry aggregate, a combustible-organic material and a polyurethane resin, the mixture being essentially free of an anti-veining agent. The cooled metal shape can then be separated from the core and mold (e.g., shake out) and the aggregate recovered and recycled. The recycled aggregate can be formed into a new foundry core, that is, preferably, essentially free of an anti-veining agent. The formation of the new foundry core using the recycled aggregate can be the same process as the formation of the foundry core with new or non-recycled aggregate, for example admixing the recycled foundry aggregate, a combustible-organic material, a polyol, and an isocyanate; polymerizing the polyol and isocyanate to form the polyurethane resin; and then shaping the admixture into the foundry core. The processes can then be repeated, where liquid metal is cast (contacted) with the foundry core, the metal shape cooled and separated, and the aggregate recycled.

The compositions and processes described herein have been primarily described and illustrated in terms of their use in the foundry art, but those skilled in the art will recognize that the binder resins and binder resin-containing compositions described herein may also be utilized in other fields, including adhesives, coatings, and composites.

EXAMPLES

Example 1

Step-Cone Casting

Step-Cone Castings were prepared as follows. A foundry mixture was prepared by admixing (A) a lignite-polyol suspension that includes about 10 wt % of lignite, about 77 wt % of Jeffol G30-650, about 9 wt % propylene carbonate, and about 4 wt % polyvinylpyrrolidone, (B) an isocyanate solution that includes about 10 wt % of propylene carbonate, about 90 wt % of MONDUR MR, and (C) silica sand (FL). N,N-Dimethylethylamine was used as a gaseous polymerization catalyst. The binder loading was 1.05 wt. % based on the total weight of the silica sand. The foundry mixture was formed into a cylindrical mold and a stepped, foundry core. In at least one example, a core wash of graphite powder was applied. Grey iron was then cast into the foundry shape (including the mold and core) at a pouring temperature of 2600° F. The cast metal was then allowed to cool to about 500° F., the aggregate was removed by shake out, and the shape was sawed in half to provide for unimpeded visual inspection of the part of the casting that contacted the foundry core.

Figure 2:
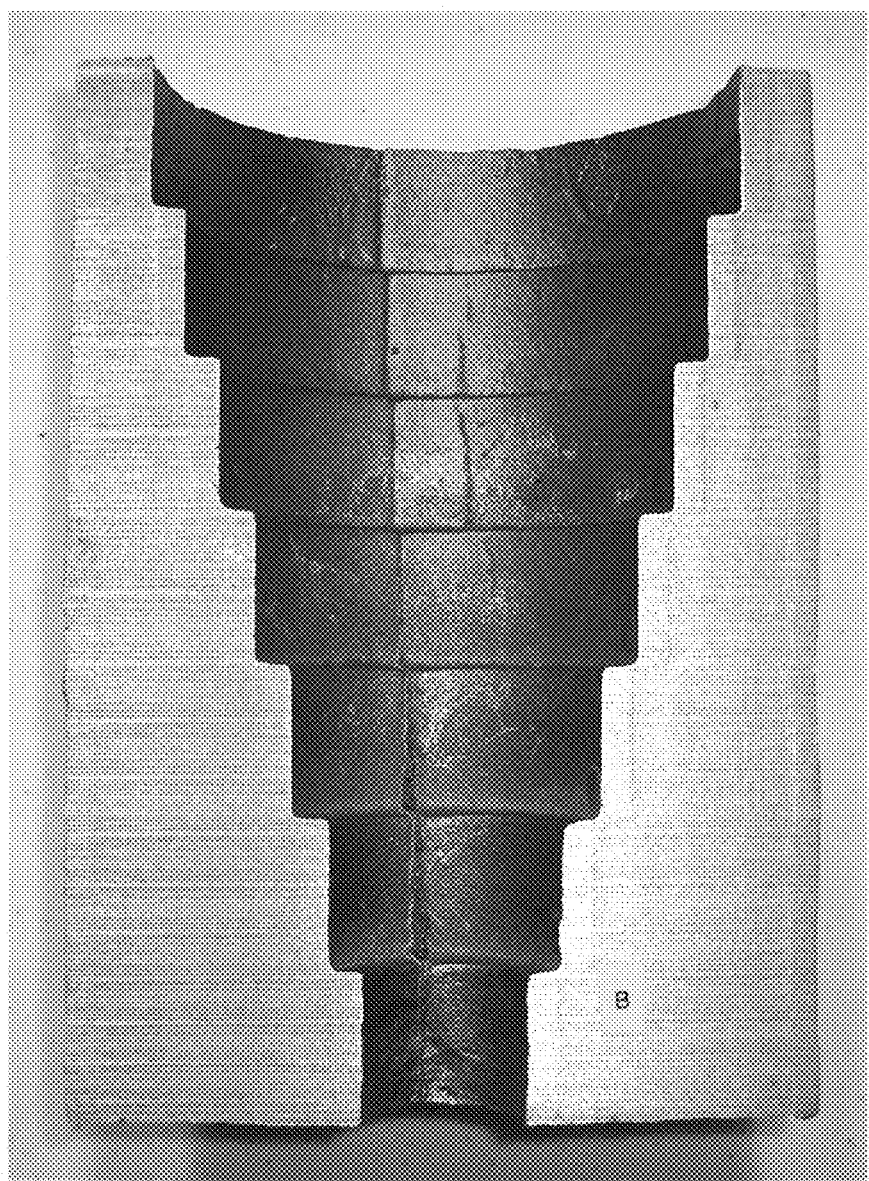
FIG. 2 is a color photograph of step core casting having a step core casting evaluation average rating of 1.1.
Figure 3:
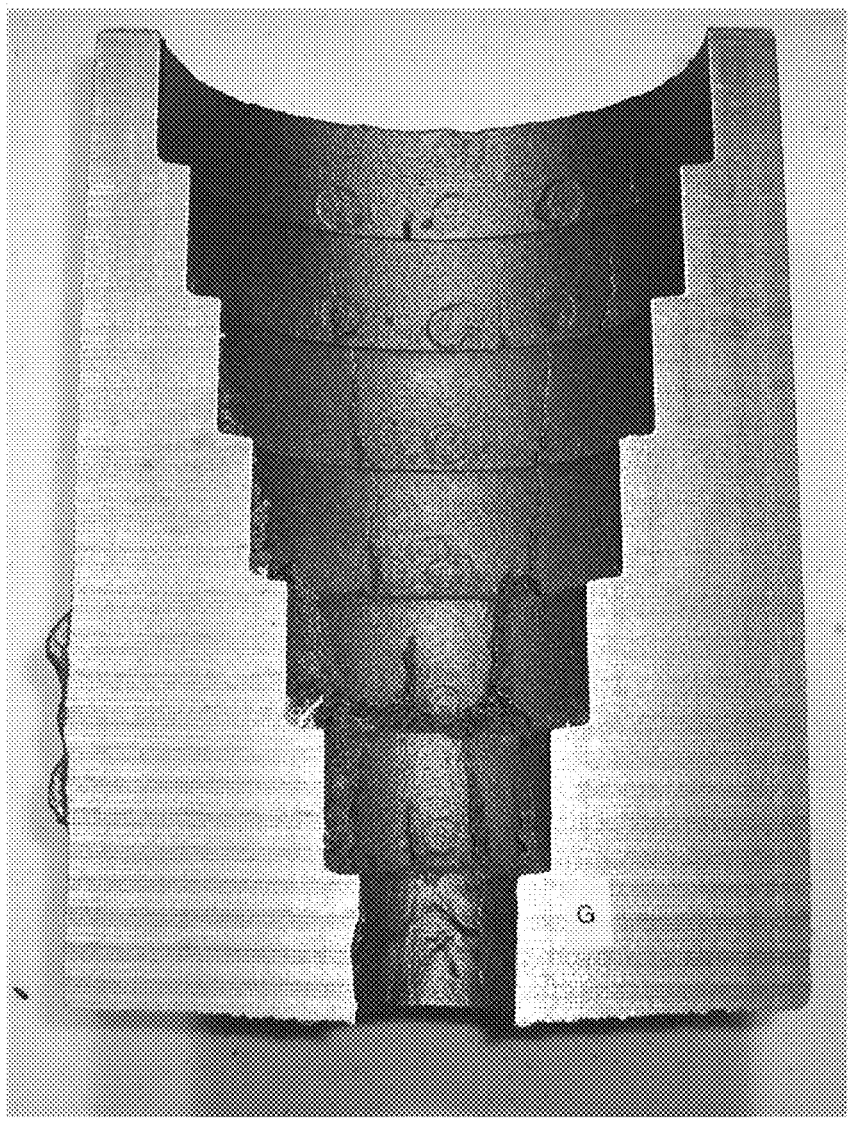
FIG. 3 is a color photograph of step core casting having a step core casting evaluation average rating of 4.8.

Grading: The each cast part was evaluated, by eight individuals familiar with metal castings and vein defects associated with core castings, on a scale from 1 to 5, with 1 being no veining (FIG. 2) and 5 being heavy veining (FIG. 3). The average rating for each cast part is presented in Table 1.

Example 2

Comparative Step-Cone Casting

Four comparative Step-Cone castings were made using a phenolic polyurethane binder (PUCB). The castings were prepared according to the general procedure of example 1. Two foundry mixtures included 5 wt. %, based on the total weight of the silica sand, VEINSEAL® 14000. Two foundry mixtures included a core wash of graphite powder. The comparative castings were grades according to the procedure of example 1 and the average ratings are presented in Table 1.

TABLE 1

Step cone casting evaluation

| Examples | Binder | Binder Loading (% based on sand) | Veinseal Loading (% based on sand) | Graphite Wash | Average Rating |
|---|---|---|---|---|---|
| Ex 1 | FL | 1.05 | 0 | Y | 1.1 |
| Ex 2 | PUCB | 1.05 | 5 | Y | 3.8 |
| Ex 3 | PUCB | 0.85 | 0 | Y | 3.5 |
| Ex 4 | FL | 1.05 | 0 | N | 2.8 |
| Ex 5 | PUCB | 1.05 | 5 | N | 2.8 |
| Ex 6 | PUCB | 0.85 | 0 | N | 4.8 |

Example 3

Compressor Housing Casting

Compressor-Housing Castings each weighing about 75 lbs were prepared as follows. A foundry mixture was prepared by admixing (A) a lignite-polyol suspension that includes about 15 wt % of lignite, about 72.5 wt % of triethylene glycol, about 8.1 wt % propylene carbonate, and about 4.4 wt % polyvinylpyrrolidone, (B) an isocyanate solution that includes about 10 wt % of propylene carbonate, about 90 wt % of MONDUR MR, and (C) silica sand. 4-phenol propyl pyridine was used as a liquid polymerization catalyst. The binder loading was 1.2 wt. % based on the total weight of the silica sand. The foundry mixture was formed into a mold and core for the compressor housing, no graphite wash was applied. Class 30 gray iron was then cast into the foundry shape (including the mold and core) at a pouring temperature of 2600° F. The cast metal was then allowed to cool to about 500° F., the aggregate was removed by shake out, and the compressor housing inspected.

Example 4

Comparative Compressor Housing Casting

Comparative Compressor Housing Castings each weighing about 75 lbs were prepared. Here, the foundry shape used in example 3 was prepared according to standard foundry procedures with an rammed oil sand core that included 2 wt %, based on the weight of the sand, iron oxide as anti-veining additive. The core was further coated with a water-based graphite wash. The compressor housings were inspected after shake out.

Upon inspection the Comparative Compressor Housing Casting from Example 4 showed minor to medium veining defects and the Compressor Housing Castings from Example 3 showed complete no veining.

Example 5

Oil Passage Casting

Oil Passage Castings each weighing about 212 lbs were prepared as follows. A foundry mixture was prepared by admixing (A) a lignite-polyol suspension that includes about 15 wt % of lignite, about 72.5 wt % of triethylene glycol, about 8.1 wt % propylene carbonate, and about 4.4 wt % polyvinylpyrrolidone, (B) an isocyanate solution that includes about 10 wt % of propylene carbonate, about 90 wt % of MONDUR MR, and (C) silica sand. 4-phenol propyl pyridine was used as a liquid polymerization catalyst. The binder loading was 1.2 wt. % based on the total weight of the silica sand. The foundry mixture was formed into a mold and core for the compressor housing, no graphite wash was applied. Gray Iron was then cast into the foundry shape (including the mold and core) at a pouring temperature of 2550° F. The cast metal was then allowed to cool to about 500° F., the aggregate was removed by shake out, and the compressor housing inspected.

Example 6

Comparative Oil Passage Casting

Comparative Oil Passage Castings each weighing about 212 lbs were prepared. Here, the foundry shape used in example 5 was prepared according to standard foundry procedures with an commercially available polyurethane no-bake foundry binder at a loading of 1.2%, based on the weight of the sand. The core was further coated with a water-based graphite wash. The oil passage housings were inspected after shake out.

Upon inspection, the scrape rate for the oil passage castings made by example 5 was 0% scrap, the oil passage castings made by example 6 was 50% scrap. Herein, scrap rate is determined by the percentage of castings that do not pass the foundries quality control. Quality control includes visual inspection of 100% of all castings.

Example 7

Thermal Distortion Test

Uncoated disc-shaped core examples (50 mm dia. 8 mm thick) from various binder systems were supplied with a loading of 1.2 wt. % binder based on the weight of the sand. A Badger 55 round grain silica sand was used for all disc-shaped examples.

A thermal distortion tester (TDT), as described in Ram rattan et al., American Foundry Society Transactions (2008) 483-492, was used to expose the 50 mm by 8 mm disc-shaped core examples to about 1000° C. for 90 sec. To operate the TDT, the electrical power was switched on and the temperature control was adjusted to 1000±10° C. representing the cast iron/sand mold interfacial temperature.

The predetermined load on the thermal distortion tester (TDT) was adjusted to simulate a specified force of molten metal acting on a mold (head pressure). A 15 cm head height of cast iron with a density of 0.69 g/cm³ provides a head pressure of 0.0103 MPa (Head Height*Metal Density). The load used during TDT was 331 g, and was calculated to represent a 15 cm (6 in) cast iron head height (Contact Area of TDT Hot Surface*Head Pressure). This particular head height was used to represent a head pressure typical with small to medium size iron castings.

The computer and data acquisition system was switched on for controlling, monitoring and plotting graphs of temperature/time versus distortion. The temperature was controlled using a K-type thermocouple at the hot surface. The test piece was inserted into the pivoting holder (gimbal) designed for holding the disc shaped specimen. The test piece was then automatically raised until direct symmetrical contact was made with the 2.00 cm dia. hot surface. This simultaneously engages the linear voltage displacement transducer (LVDT) and a laser that measure the distortion longitudinally. The data acquisition system automatically logged and plotted the distortion/temperature versus time curves. During the test, the predetermined load chosen to represent the force of molten metal pressing against the mold/core wall, presses on the gimbal, which is in contact with the circumference of the specimen, which presses the top of the specimen against the 2 cm dia. hot surface. Any downward movement of the gimbal is recorded as expansion (and appears as upward movement when plotted). Any upward movement of the gimbal, due to the specimen becoming plastic and distorting is recorded as plastic distortion (and appears as downward movement when plotted). Expansion ($D_E$) and plastic distortion ($D_P$) (in the longitudinal distortion) can be obtained from the thermal distortion curve (TDC). In this investigation, the total distortion ($T_D = \Sigma D_E + \Sigma D_P$) was recorded.

The duration of the TDT was 90 seconds and then the head pressure was removed.

Nine binder examples were prepared and run under the Thermal Distortion Test, each example run twelve times. Examples 7-9 are representative of the herein described method. Table 2 provides the relative weight percentages for (A) an admixture of lignite and polyol. The uncoated disc-shaped core examples were then prepared by admixing (A) the admixture of lignite and polyol with (B) an isocyanate solution that includes about 10 wt % of propylene carbonate, about 90 wt % of MONDUR MR, and (C) silica sand; the uncoated disc-shaped core examples were then polymerized as described above.

TABLE 2

|  | Lignite | PVP K-30 | TEG | PC |
| --- | --- | --- | --- | --- |
| Ex 7 | 27 | 8.1 | 58.4 | 6.5 |
| Ex 8 | 22 | 6.5 | 64.35 | 7.15 |
| Ex 9 | 15 | 4.43 | 72.51 | 8.06 |

Examples 10 is representative of the herein described method. Table 3 provides the relative weight percentages for (A) an admixture of lignite and polyol. The uncoated disc-shaped core examples were then prepared by admixing (A) the admixture of lignite and polyol with (B) an isocyanate solution that includes about 10 wt % of propylene carbonate, about 90 wt % of MONDUR MR, and (C) an admixture of silica sand and 0.3 wt. % lignite (based on mass of the sand); the uncoated disc-shaped core examples were then polymerized as described above.

TABLE 3

|  | TEG | PC |
| --- | --- | --- |
| Ex 10 | 90 | 10 |

Examples 11 is representative of the herein described method. Table 4 provides the relative weight percentages for (A) an admixture of lignite and polyol. The uncoated disc-shaped core examples were then prepared by admixing (A) the admixture of lignite and polyol with (B) an isocyanate solution that includes about 10 wt % of propylene carbonate, about 90 wt % of MONDUR MR, and (C) silica sand; the uncoated disc-shaped core examples were then polymerized as described above.

TABLE 4

|      | Lignite | PVP K30 | PC   | Jeffol G30-650 |
|------|---------|---------|------|----------------|
| Ex 11 | 10      | 3.54    | 8.65 | 77.81          |

Examples 12-15 are comparative examples where the uncoated disc-shaped core is free of lignite. Example 12 was manufactured by admixing (A) an admixture of 9.7 wt. % PC, 90 wt. % Jeffol G30-650, and 0.3 wt. % Silquest A1120; (B) an isocyanate solution that includes about 10 wt % of propylene carbonate, about 90 wt % of MONDUR MR, and (C) silica sand; the uncoated disc-shaped core examples were then polymerized as described above. Example 13 was manufactured with Alphathane NB (ALPHA RESINS, Detroit Mich.); Example 14 was manufactured with a furan resin from (ASK-Chemicals, Columbus, Ohio); Example 15 was manufactured with NovaSet HPA (ASK-Chemicals, Columbus, Ohio).

Figure 4:
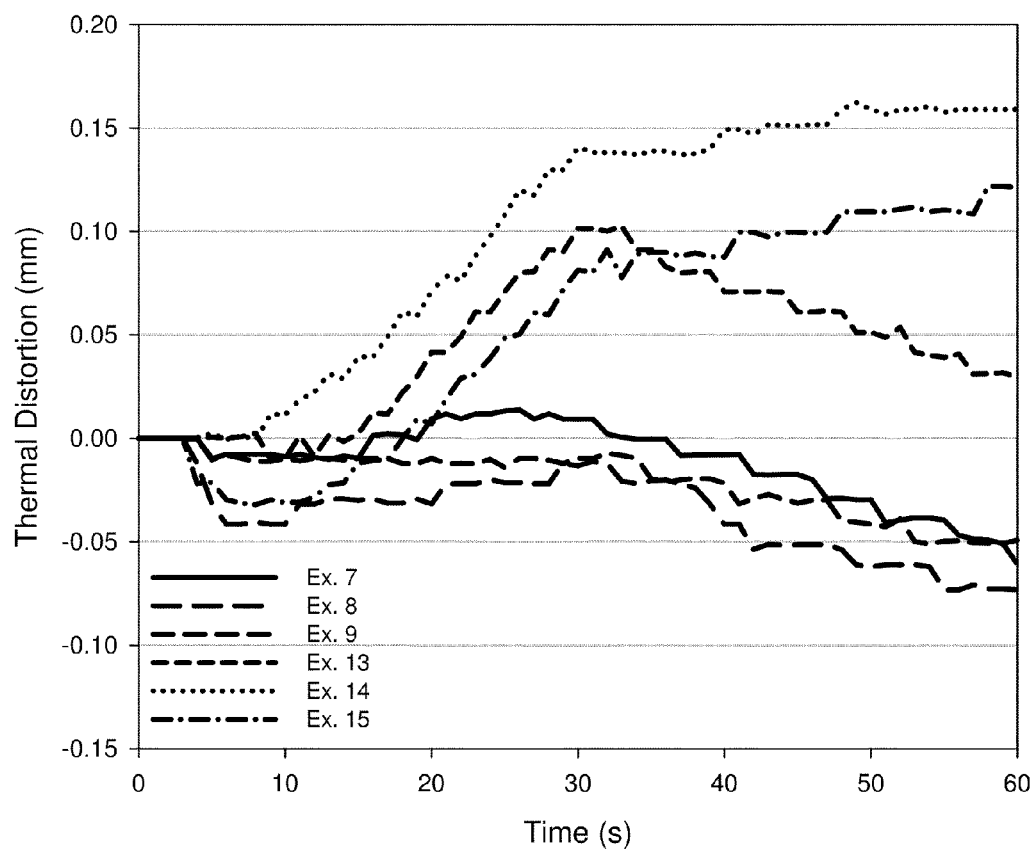
FIG. 4 is a plot of thermal distortion data for examples 7-9 and 13-15.

The average Thermal Distortion Test curves for the twelve runs of examples 7-9 and comparative examples 13-15 are presented in FIG. 4. The average maximum expansion of the twelve Thermal Distortion Test results for each of examples 7-15 is presented in Table 5

TABLE 5

|      | Maximum Average Expansion (mm) |
|------|-------------------------------|
| Ex 7  | 0.0137 |
| Ex 8  | 0.000  |
| Ex 9  | 0.000  |
| Ex 10 | 0.0219 |
| Ex 11 | 0.0815 |
| Ex 12 | 0.0415 |
| Ex 13 | 0.1025 |
| Ex 14 | 0.1712 |
| Ex 15 | 0.1217 |

The TDC's for all systems tested showed undulations that indicate thermo-mechanical and thermo-chemical changes in the binder system at elevated temperature. Note that a TDC for distortion longitudinal depicts an average for 12 specimens tested (FIG. 4). The expansion differences among the systems were due to differences in binder since the base sand system was the same.

The foregoing written description provides examples of structure and function representative of the present invention, but not intended to limit the scope beyond that which is recited in the appending claims.

What is claimed is:

1. A method of manufacturing a metal shape comprising:
   contacting a liquid metal and a surface of a foundry core under conditions wherein vein defects occur, wherein the surface of the foundry core comprises a foundry aggregate, a solid combustible-organic material and a polyurethane resin, and the foundry core layer being essentially free of an anti-veining agent, and wherein the solid combustible-organic material has a moisture content of less than 25 wt % and does not react with any isocyanate functionality;
   cooling the liquid metal to a temperature below its melting point thereby forming a metal shape; and then
   removing the foundry core from the metal shape.

2. The method of claim 1, wherein the foundry core comprises the foundry aggregate, the combustible-organic solid and the polyurethane resin.

3. The method of claim 2, wherein the foundry core is essentially free of the anti-veining agent.

4. The method of claim 1, wherein the foundry aggregate comprises silica sand, olivine, zircon, chromite, and mixtures thereof.

5. The method of claim 1, wherein the combustible-organic solid is selected from the group consisting of asphalt; bark; bitumen; powdered carbon; charcoal; bituminous coal; coke; flaked graphite; lignite; malt; crushed synthetic resin; pine resin; sawdust; powdered starch; glucose syrup, powdered sugar; tar; turpentine; wood chips; walnut shell; and a mixture thereof.

6. The method of claim 5, wherein the combustible-organic material is selected from the group consisting of lignite, malt, glucose syrup, powdered sugar, and a mixture thereof.

7. The method of claim 6, wherein the combustible-organic material is selected from the group consisting of lignite, glucose syrup, and a mixture thereof.

8. The method of claim 1, wherein the polyurethane resin is the product of the polymerization of a polyol and an isocyanate.

9. The method of claim 8, wherein the polyol is triethylene glycol.

10. The method of claim 1 further comprising forming the foundry core from a foundry mix that comprises the foundry aggregate, the combustible-organic solid, a polyol, and an isocyanate.

11. The method of claim 10 further comprising:
    polymerizing the polyol and the isocyanate to form the polyurethane resin; and then
    curing the polyurethane resin.

12. The method of claim 10 further comprising: coating the foundry core with a graphite wash.

13. The method of claim 1, wherein the anti-veining agent is selected from the group consisting of iron oxides, titanium dioxide, lithium oxide, sodium bicarbonate, sodium carbonate, shale, fine ground glass particles, particles of wood pre-coated with a resin, granular slag, pulverized sea-coal, alkaline earth or alkaline metal fluoride, lithia-containing materials, and a mixture thereof.

14. The method of claim 1 further comprising limiting a maximum average expansion to less than 0.10 mm based on a Thermal Distortion Test.

15. The method of claim 14, wherein the maximum average expansion is limited to less than 0.03 mm based on a Thermal Distortion Test.

16. A method of casting vein-free metal shapes comprising:
    forming a foundry core that comprises a foundry aggregate, a solid combustible-organic material, a polyurethane resin, and that is essentially free of anti-veining agents, wherein the solid organic combustible-organic material has a moisture content of less than 25 wt % and does not react with any isocyanate functionality;
    contacting a liquid metal with the foundry core under the conditions wherein vein defects occur; and then removing a cooled metal shape from the foundry core; wherein the metal shape is free of or substantially free of vein defects.

17. The method of claim 16, wherein determining conditions wherein vein defects occur comprises:
contacting a liquid metal with a foundry shape consisting of a polyurethane resin and a foundry aggregate; and
removing a cooled metal shape from the foundry shape; wherein the metal shape comprises vein defects.

18. The method of claim 16, wherein the anti-veining agent is selected from the group consisting of iron oxides, titanium dioxide, lithium oxide, sodium bicarbonate, sodium carbonate, shale, fine ground glass particles, particles of wood precoated with a resin, granular slag, pulverized sea-coal, alkaline earth or alkaline metal fluoride, lithia-containing materials, and a mixture thereof.

19. A method of manufacturing a metal shape comprising:
contacting a liquid metal with a foundry core and a foundry mold, that individually comprise a foundry aggregate, a solid combustible-organic material and a polyurethane resin, and are essentially free of an anti-veining agent, wherein the solid combustible-organic material has a moisture content of less than 25 wt % and does not react with any isocyanate functionality; and then
separating the metal shape from the foundry core and foundry mold;
wherein the foundry core has a maximum average expansion of less than 0.03 mm based on a Thermal Distortion Test.

20. The method of claim 19 further comprising:
recycling the foundry aggregate from the separated foundry core and foundry mold, and
forming a recycled foundry core that is essentially free of an anti-veining agent from the recycled foundry aggregate.

21. The method of claim 20, wherein forming the foundry core from the recycled foundry aggregate comprises:
admixing the recycled foundry aggregate, a combustible-organic material, a polyol, and an isocyanate;
polymerizing the polyol and isocyanate to form the polyurethane resin; and
shaping the admixture into the foundry core.

22. The method of claim 20 further comprising:
contacting a liquid metal with the recycled foundry core.

23. The method of claim 19 further comprising forming the foundry core and foundry mold from a mixture consisting essentially of the foundry aggregate, the combustible-organic material and the polyurethane resin.

24. The method of claim 19, wherein the anti-veining agent is selected from the group consisting of iron oxides, titanium dioxide, lithium oxide, sodium bicarbonate, sodium carbonate, shale, fine ground glass particles, particles of wood precoated with a resin, granular slag, pulverized sea-coal, alkaline earth or alkaline metal fluoride, lithia-containing materials, and a mixture thereof.

25. The method of claim 19, wherein the foundry core has a maximum average expansion of less than 0.02 mm based on a Thermal Distortion Test.

26. The method of claim 19, wherein the foundry core has a maximum average expansion of less than 0.01 mm based on a Thermal Distortion Test.

27. The method of claim 19, wherein the foundry core has a maximum average expansion of approximately 0.00 mm based on a Thermal Distortion Test.

28. A method of manufacturing a metal shape comprising:
contacting a liquid metal and a surface of a foundry core under conditions wherein vein defects occur, the surface of the foundry core comprises about 90 wt. % to about 99.9 wt. % of a foundry aggregate, about 0.005 wt. % to about 2.2 wt. % of a solid combustible-organic material, about 0.1 wt. % to about 10 wt % of a polyurethane resin, and a non-performance additive, and wherein the solid combustible-organic material has a moisture content of less than 25 wt % and does not react with any isocyanate functionality;
cooling the liquid metal to a temperature below its melting point thereby forming a metal shape; and then
removing the foundry core from the metal shape.

29. The method of claim 1, wherein the solid combustible-organic material has a moisture content of less 15 wt. %.

30. The method of claim 1, wherein the solid combustible-organic material has a moisture content of less 10 wt. %.

31. The method of claim 1, wherein the solid combustible-organic material has a moisture content of less 5 wt. %.

32. The method of claim 1, wherein the solid combustible-organic material comprises lignite.

* * * * *